United States Patent
Yang

(10) Patent No.: US 11,322,865 B2
(45) Date of Patent: May 3, 2022

(54) TERMINAL BLOCK ASSEMBLY FOR WIRE CONNECTION OF MOTOR AND ASSEMBLING METHOD THEREOF

(71) Applicant: HYUNDAI MOBIS Co. Ltd., Seoul (KR)

(72) Inventor: Hae Jun Yang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1 day.

(21) Appl. No.: 16/923,730

(22) Filed: Jul. 8, 2020

(65) Prior Publication Data

US 2021/0013643 A1 Jan. 14, 2021

(30) Foreign Application Priority Data

Jul. 9, 2019 (KR) .................. 10-2019-0082532

(51) Int. Cl.
*H01R 9/24* (2006.01)
*H01R 9/22* (2006.01)
*H01R 43/00* (2006.01)

(52) U.S. Cl.
CPC ........... *H01R 9/2416* (2013.01); *H01R 9/223* (2013.01); *H01R 43/00* (2013.01); *H01R 2201/10* (2013.01)

(58) Field of Classification Search
CPC ... H01R 4/34; H01R 9/24; H01R 4/30; H01R 13/748; H01R 13/504; H01R 13/5202; H01R 13/405; H01R 13/41; H01R 13/521; H01R 2201/26; H01R 9/2491; H01R 11/12; H01R 13/207; H01R 13/432; H01R 13/512; H01R 13/516; H01R 13/6581; H01R 13/74; H01R 2105/00; H01R 24/60; H01R 25/162; H01R 43/24; H01R 4/302; H01R 4/305; H01R 4/36; H01R 12/515; H01R 9/18; H01R 9/22; H01R 9/2416; H01R 9/223
See application file for complete search history.

(56) References Cited

U.S. PATENT DOCUMENTS

| | | | | |
|---|---|---|---|---|
| 4,273,408 A | * | 6/1981 | Orr | ...... H01R 9/2491 439/709 |
| 4,630,882 A | * | 12/1986 | Naylor | ...... H01R 9/24 439/444 |
| 5,595,505 A | * | 1/1997 | Duke | ...... H01R 4/34 439/630 |

(Continued)

FOREIGN PATENT DOCUMENTS

KR 10-2013-0006164 11/2013

*Primary Examiner* — Edwin A. Leon
*Assistant Examiner* — Matthew T Dzierzynski
(74) *Attorney, Agent, or Firm* — H.C. Park & Associates, PLC

(57) ABSTRACT

A terminal block assembly for wire connection of a motor, which includes: a terminal block body; one or more bus bar supports which are formed on the terminal block body; one or more bus bar bodies which have bent shapes corresponding to outer surfaces of the bus bar supports and are rested on the terminal block body or the bus bar supports; one or more terminal connectors which are formed at one ends of the bus bar bodies and are held in contact with one or more connector terminals; and one or more coil connectors which are formed at the other ends of the bus bar bodies and are connected to one or more coils of a motor.

16 Claims, 15 Drawing Sheets

(56) References Cited

U.S. PATENT DOCUMENTS

| | | | |
|---|---|---|---|
| 6,176,747 B1* | 1/2001 | Rowe | H01R 9/2491 |
| | | | 439/701 |
| 7,559,810 B1* | 7/2009 | Wu | H01R 4/34 |
| | | | 439/709 |
| 8,414,336 B2* | 4/2013 | Yu | H01R 4/30 |
| | | | 439/660 |
| 9,004,956 B2* | 4/2015 | Wu | H01R 4/34 |
| | | | 439/810 |
| 9,093,761 B1* | 7/2015 | Wu | H01R 4/42 |
| 10,622,733 B2* | 4/2020 | Sakakura | H01R 9/16 |
| 10,644,418 B2* | 5/2020 | Kawamura | H01R 25/162 |
| 2020/0028403 A1* | 1/2020 | Francis | H01R 4/029 |

* cited by examiner

SECTION A-A'

SECTION B-B'

SECTION C-C'

SECTION D-D'

TERMINAL BLOCK ASSEMBLY FOR WIRE CONNECTION OF MOTOR AND ASSEMBLING METHOD THEREOF

CROSS-REFERENCE TO RELATED APPLICATION

This application claims priority from and the benefit of Korean Patent Application No. 10-2019-0082532, filed on Jul. 9, 2019, which is hereby incorporated by reference for all purposes as if set forth herein.

BACKGROUND

Field

Exemplary embodiments of the present disclosure relate to a terminal block assembly for wire connection of a motor and an assembling method thereof, and more particularly, to a terminal block assembly for wire connection of a motor, which is used to electrically connect connector terminals and coils of the motor, and an assembling method thereof.

Discussion of the Background

In general, a terminal block for wire connection of a motor functions as a bridge that conducts a current through mechanical connection of a high-voltage connector and a coil of the motor. This conventional terminal block has a structure that includes a base and a cover, and a complicated structure in which a plurality of electric components including a high-voltage connector, a block bus bar, and a motor phase bus bar are disposed on the base so as to overlap one another.

Further, the conventional terminal block presses and holds the plurality of components corresponding to the high-voltage connector, the block bus bar, and the motor phase bus bar in close contact with the base using the cover, in order to restrict movement of the high-voltage connector, the block bus bar, and the motor phase bus bar due to vibrations of a vehicle. However, the conventional terminal block has difficulty in applying a pressing element when the cover is designed and produced, and has a problem in that, because fastening members are fastened in a plurality of places corresponding to this pressing element even in a process of assembling the cover to the base, the number of components is increased, and the assembling process is complicated. Therefore, there is a need to solve this problem.

The background of the present disclosure is disclosed in Korean Patent No. 1333839 (registered on Nov. 21, 2013, and entitled "TERMINAL BLOCK, MOTOR USING THE SAME, AND PUMP HAVING THE MOTOR").

SUMMARY

Various embodiments are directed to a terminal block assembly for wire connection of a motor and an assembling method thereof, capable of being easily applied due to a simpler structure, and implementing a reduction in the number of components and simplification of an assembling process.

In an embodiment, a terminal block assembly for wire connection of a motor includes: a terminal block body; one or more bus bar supports which are formed on the terminal block body; one or more bus bar bodies which have bent shapes corresponding to outer surfaces of the bus bar supports and are rested on the terminal block body or the bus bar supports; one or more terminal connectors which are formed at one ends of the bus bar bodies and are held in contact with one or more connector terminals; and one or more coil connectors which are formed at the other ends of the bus bar bodies and are connected to one or more coils of a motor.

In an embodiment, the terminal block body may include: a base on which the plurality of bus bar supports are formed; and one or more partitions which are formed on the base so as to mutually partition the plurality of bus bar supports. The partition may include an anti-movement slit which is formed on one side of the bus bar support so as to extend in a forward/backward direction and through which the bus bar body passes.

In an embodiment, the partition may include anti-movement walls which are formed to protrude from both sides of the bus bar support and are held in contact with the bus bar body.

In an embodiment, the terminal block assembly for wire connection of a motor may further include one or more bus bar fastening grooves which are sunkenly formed in at least one side of the terminal block body and the bus bar support and into which one or more an insertion stoppers formed to protrude from the bus bar body is inserted and caught.

In an embodiment, the bus bar support may include: a support body which is formed to protrude from an upper portion of the terminal block body, and whose front and rear surfaces are held in contact with the bus bar body; and a terminal connection hole which is formed in the front of the support body and to which a terminal fastening member passing through the connector terminal and the terminal connector is fastened.

In an embodiment, the bus bar body may include: a front-rear extension which extends in a forward/backward direction and is held in contact with the bus bar support; a front stopper which is connected to a front end of the front-rear extension and is held in contact with the bus bar support such that backward movement thereof is restricted, and on which the terminal connector is formed; and a rear stopper which is formed to extend at a rear end of the front-rear extension in a direction facing the front stopper and is held in contact with the bus bar support such that forward movement thereof is restricted, and which is connected to the coil connector.

In an embodiment, the front-rear extension may pass through the anti-movement slit formed on one side of the bus bar support, and may be held in contact with a side of the bus bar support, the front stopper may extend from a front end of the front-rear extension in a lateral direction, and may be held in contact with the front end of the bus bar support, and the rear stopper may extend from the rear end of the front-rear extension in a lateral direction facing the front stopper, and may be held in contact with a rear end of the bus bar support.

In an embodiment, the front-rear extension may be rested on an upper portion of the bus bar support, the front stopper may extend downward from the front end of the front-rear extension, and may be held in contact with a front end of the bus bar support, and the rear stopper may extend downward from the rear end of the front-rear extension to face the front stopper, and may be held in contact with a rear end of the bus bar support.

In an embodiment, the terminal block assembly for wire connection of a motor may further include one or more insertion stoppers which are formed to protrude from at least one side of the bus bar body and the coil connector, and are inserted and caught into one or more bus bar fastening grooves formed in the terminal block body or the bus bar support.

In an embodiment, the insertion stopper may include: a protrusion which is formed on at least one side of the bus bar body and the coil connector so as to protrude toward the terminal block body; and an anti-separation catch which is formed to protrude from the protrusion, has a shape in which a width thereof is reduced toward an end of the protrusion, and is held in contact with an inner surface of the bus bar fastening groove.

In an embodiment, the bus bar body and the coil connector may be integrally formed by bending front and rear ends of a metal piece having a forward/backward extension length in a lateral direction or an upward/downward direction.

In an embodiment, an assembling method of a terminal block assembly for wire connection of a motor includes: a bus bar resting step of engaging a bus bar body having a bent shape corresponding to an outer surface of a bus bar support with the bus bar support formed on a terminal block body; and a connector terminal connecting step of mutually connecting a terminal connector, formed at one end of the bus bar body, and a connector terminal.

In an embodiment, the bus bar resting step may include fitting a front-rear extension of the bus bar body into an anti-movement slit formed to extend on one side of the bus bar support in a forward/backward direction, and disposing a front stopper connected to a front end of the front-rear extension and a rear stopper connected to a rear end of the front-rear extension, so as to be held in contact with front and rear surfaces of the bus bar support, respectively.

In an embodiment, the bus bar resting step may include fitting the bus bar body into the anti-movement slit, and inserting an insertion stopper, formed to protrude from at least one side of the bus bar body and a coil connector, into a bus bar fastening groove formed in at least one side of the terminal block body and the bus bar support.

In an embodiment, the bus bar resting step may include resting a front-rear extension of the bus bar body on an upper surface of the bus bar support, and disposing a front stopper connected to a front end of the front-rear extension and a rear stopper connected to a rear end of the front-rear extension, so as to be held in contact with front and rear surfaces of the bus bar support, respectively.

In an embodiment, the bus bar resting step may include resting the bus bar body on the bus bar support, and inserting an insertion stopper, formed to protrude from at least one side of the bus bar body and the coil connector, into a bus bar fastening groove formed in at least one side of the terminal block body and the bus bar support.

In an embodiment, the connector terminal connecting step may include causing a terminal fastening member to pass through the connector terminal and the terminal connector and to be fastened to a terminal connection hole formed in a front portion of the bus bar support, and holding the connector terminal and the terminal connector in pressure contact.

The terminal block assembly for wire connection of a motor and the assembling method thereof can stably implement a function of a terminal block that restricts a connector terminal and a coil of the motor to a set position and electrically connects the connector terminal and the coil, due to a simple structure in which a component having a structure in which a bus bar body, a terminal connector, and a coil connector are integrally connected is rested on a terminal block body or a bus bar support so as to surround an outer surface of the bus bar support.

Further, the present disclosure can be easily produced as a structure in which the bus bar body, the terminal connector, and the coil connector are integrated as a single component, using a simple process of bending front and rear ends of a metal piece, having a forward/backward extension length, in a lateral direction or an upward/downward direction and punching a hole.

Further, in the present disclosure, the bus bar body is in close contact with the bus bar support in a lateral direction and a forward/backward direction, the movement thereof in the forward/backward direction and the lateral direction is stably restricted. For this reason, there is no need to additionally apply separate pressing elements for pressing and holding a plurality of bus bar bodies in close contact with the bus bar supports in multiple directions in consideration of vibrations of a vehicle, and the like, and thus the plurality of bus bar bodies can be easily applied in a simpler structure. To be more specific, the number of components can be further reduced, so that production and management can be easily conducted, and productivity can be improved by simplification of an assembly process.

DETAILED DESCRIPTION OF THE ILLUSTRATED EMBODIMENTS

Figure 1:
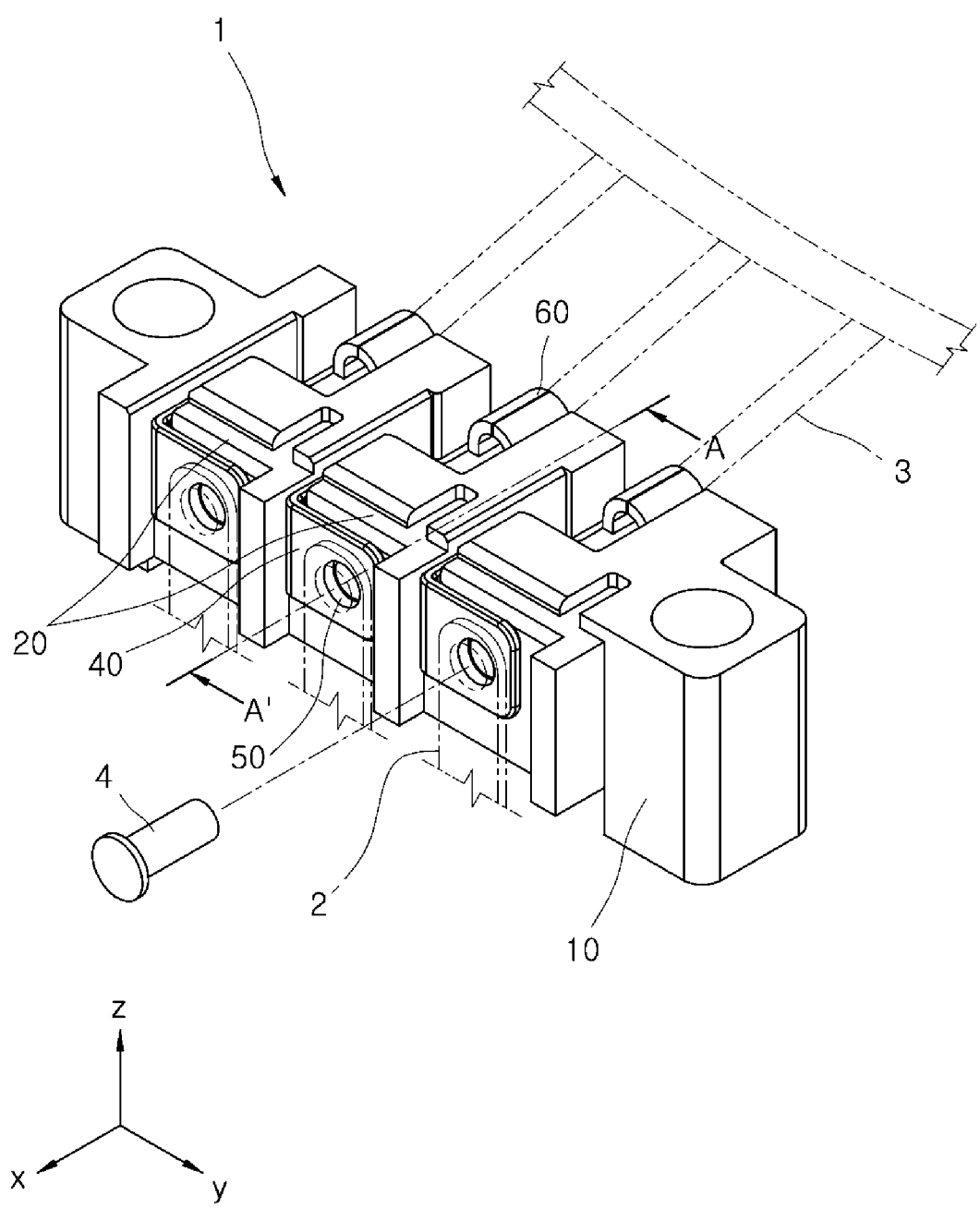
FIG. 1 is a perspective view schematically illustrating a terminal block assembly for wire connection of a motor according to a first embodiment of the present disclosure.

Hereinafter, embodiments of a terminal block assembly for wire connection of a motor and an assembling method thereof according to the present disclosure will be described with reference to the accompanying drawings. Thicknesses of lines or sizes of components illustrated in the drawings in the process may be exaggeratedly illustrated for clarity and convenience of description. Further, terms, as will be described below, are terms defined in consideration of their functions in the present disclosure, which may be varied according to the intention of a user or an operator or practice. Therefore, the terms should be defined based on the whole contents of this specification.

Figure 2:
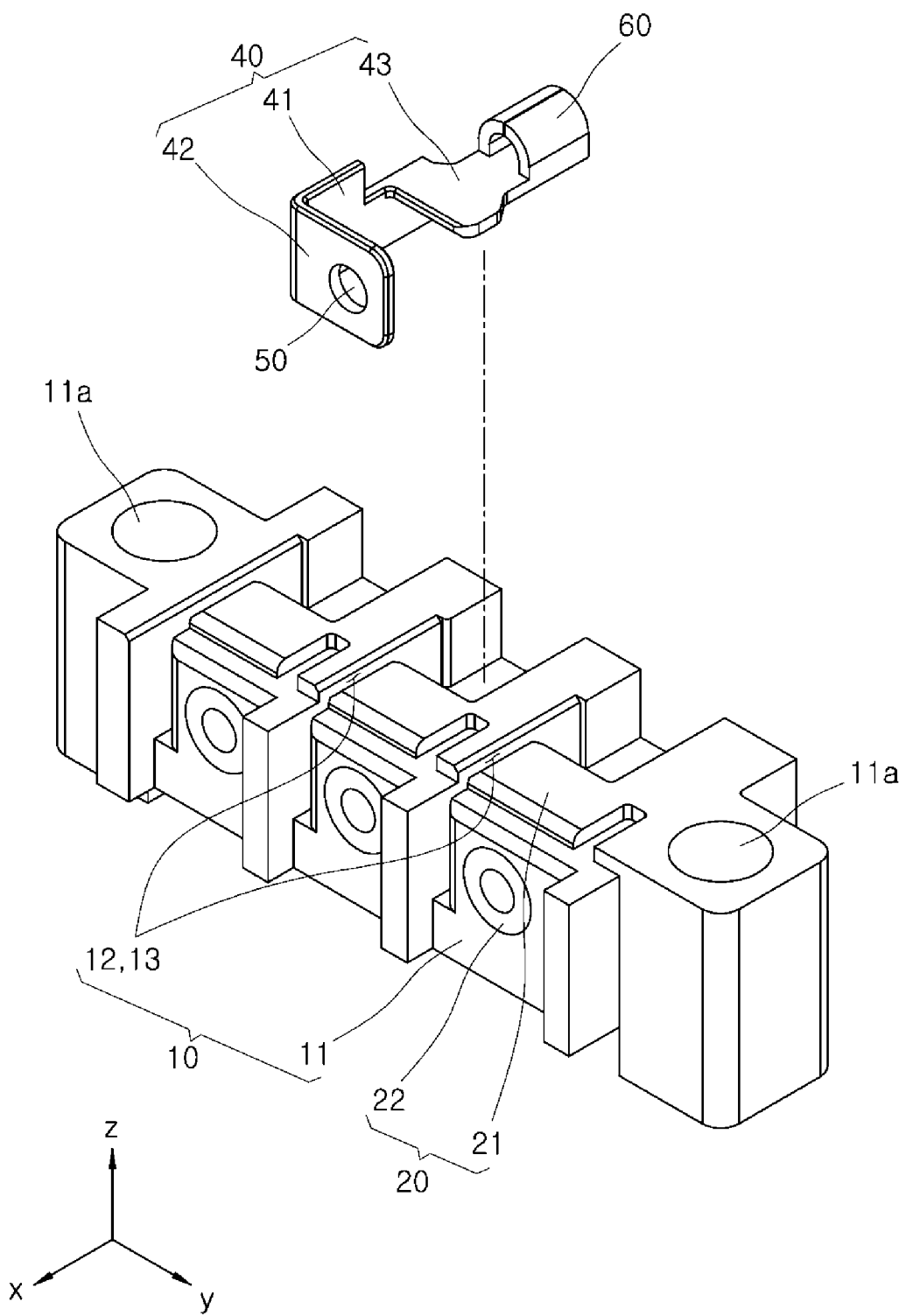
FIG. 2 is an exploded perspective view schematically illustrating main parts of the terminal block assembly for wire connection of a motor according to the first embodiment of the present disclosure.

FIG. 1 is a perspective view schematically illustrating a terminal block assembly for wire connection of a motor according to a first embodiment of the present disclosure, and FIG. 2 is an exploded perspective view schematically illustrating main parts of the terminal block assembly for wire connection of a motor according to the first embodiment of the present disclosure.

Hereinafter, positional relationships and shapes of components will be described by setting x, y, and z directions illustrated in FIGS. 1 and 2 as front, right, and upper sides for convenience of description, respectively.

Referring to FIGS. 1 and 2, a terminal block assembly 1 for wire connection of a motor according to a first embodiment of the present disclosure includes a terminal block body 10, bus bar supports 20, bus bar bodies 40, terminal connectors 50, and coil connectors 60.

The terminal block body 10 is a part for supporting a plurality of bus bar bodies 40, connector terminals 2, and coils 3 of the motor in position, and has a structure in which the bus bar bodies 40, the connector terminals 2, and the coils 3 can be fastened and fixed at setting positions on the motor (not illustrated) by fastening members (not illustrated). The bus bar supports 20 are parts for restricting and supporting the bus bar bodies 40 in position, and are formed at an upper portion of the terminal block body 10.

Each of the bus bar bodies 40 has a structure that has a bent shape corresponding to an outer surface of each of the bus bar supports 20, and more particularly, surrounds each of the bus bar supports 20 in three directions, and is rested on the terminal block body 10. Each of the terminal connectors 50 is a part that is held in contact with each of the connector terminals 2, and is formed to pass through a front end of each of the bus bar bodies 40 in a shape of a hole. Each of the coil connectors 60 is a part that is connected to each of the coils 3 of the motor, is connected to a rear end of each of the bus bar bodies 40, surrounds a circumference of each of the coils, and is held in pressure contact with and connected to each of the coils.

Referring to FIG. 2, the terminal block body 10 according to a first embodiment of the present disclosure includes a base 11 and partitions 12.

The base 11 is a part that forms a basic frame of the terminal block body 10, is formed to extend in a direction in which the bus bar supports 20 are arranged, and has fastening holes 11a through which fastening members (not illustrated) can pass and which are formed in opposite ends thereof in an extending direction so as to pass through opposite ends thereof in an upward/downward direction. A plurality of bus bar supports 20 are formed at an upper portion of the base 11. The plurality of bus bar supports 20 are arranged in a leftward/rightward direction, and the partition 12 is formed on the base 11 so as to mutually partition the plurality of bus bar supports 20.

The partition 12 according to the first embodiment of the present disclosure includes hollow anti-movement slits 13 that are formed on left sides of the bus bar supports 20 so as to extend in a forward/backward direction. The anti-movement slits 13 have leftward/rightward widths and upward/downward depths corresponding to front-rear extensions 41 (to be described below) of the bus bar bodies 40. The bus bar bodies 40 are assembled by being fitted into the anti-movement slits 13 from the top, pass through the anti-movement slits 13 in a forward/backward direction, and extend in a forward/backward direction of the bus bar supports 20.

Figure 3:
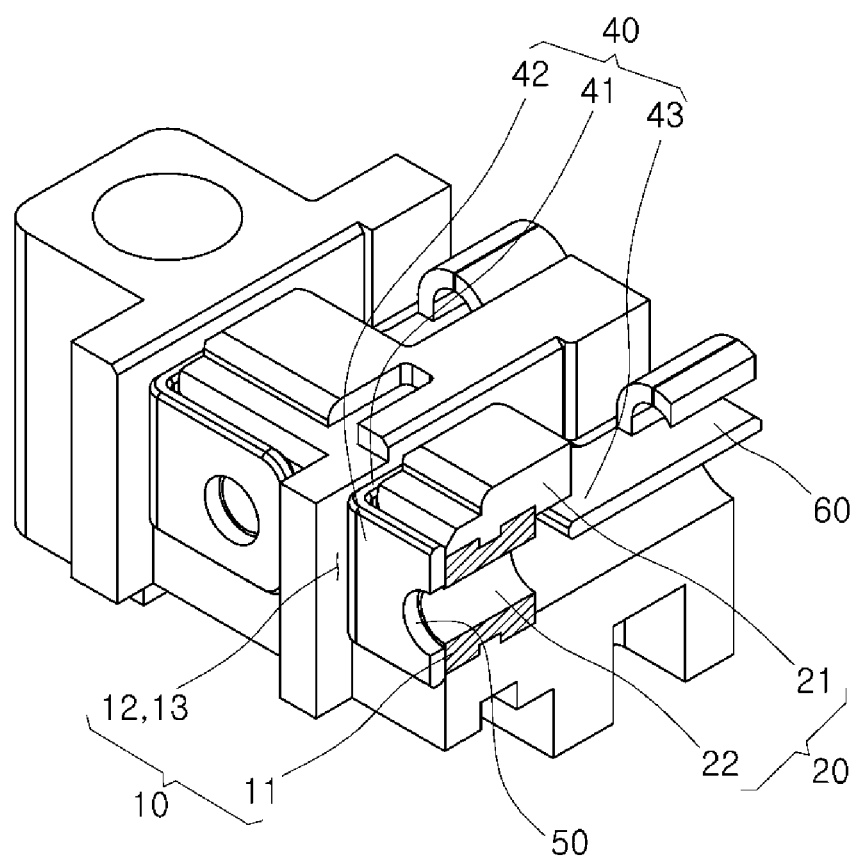
FIG. 3 is a sectional view taken along line A-A' of FIG. 1.
Figure 4:
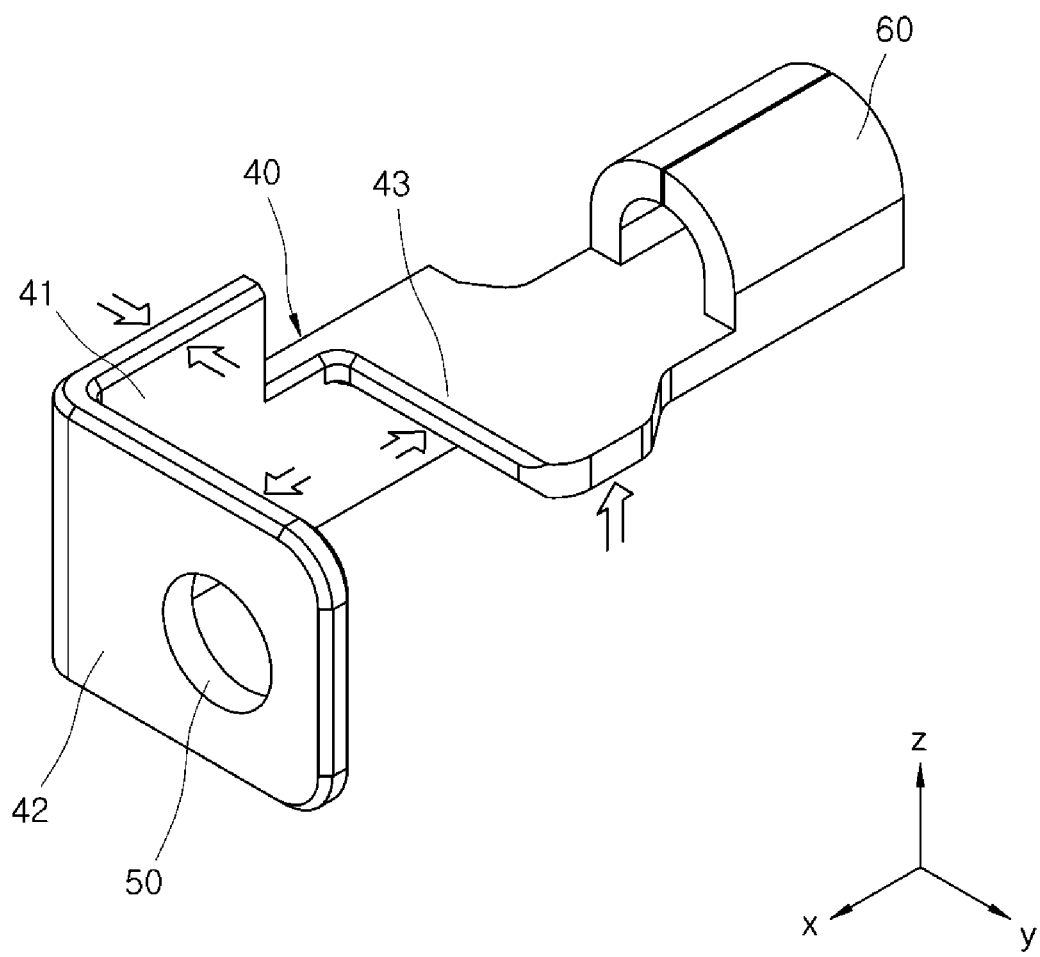
FIG. 4 is a conceptual view illustrating movement restricting directions of a bus bar body and an insertion stopper of the terminal block assembly for wire connection of a motor according to the first embodiment of the present disclosure.

FIG. 3 is a sectional view taken along line A-A' of FIG. 1, and FIG. 4 is a conceptual view illustrating movement restricting directions of the bus bar body and an insertion stopper of the terminal block assembly for wire connection of a motor according to the first embodiment of the present disclosure.

Referring to FIGS. 2 and 3, the bus bar support 20 according to the first embodiment of the present disclosure includes a support body 21 and a terminal connection hole 22.

The support body 21 has the shape of a hexahedral block on the whole, and is formed to protrude from the upper portion of the terminal block body 10. A left surface of the support body 21 is held in contact with the front-rear extension 41 of the bus bar body 40, and front and rear surfaces of the support body 21 are held in contact with front and rear stoppers 42 and 43 (to be described below) of the bus bar body 40, respectively. A right surface of the support body 21 is held in contact with the front-rear extension 41 of another neighboring bus bar body 40.

The terminal connection hole 22 is a part for bonding and fixing the connector terminal 2 and the terminal connector 50 in position, and is formed in the front of the support body 21. The terminal connection hole 22 has a female threaded structure to which a terminal fastening member 4 having a male threaded structure and passing through the connector terminal 2 and the terminal connector 50 can be screwed (see FIG. 1).

The terminal fastening member 4 is fastened to the terminal connection hole 22 after sequentially passing through the connector terminal 2 and the terminal connector 50, and thereby is held in pressure contact with the connector terminal 2 and the terminal connector 50 on the basis of the terminal connection hole 22. The connector terminal 2 and the terminal connector 50 are held in pressure contact, and thereby are electrically connected and stably maintained.

Referring to FIGS. 2 and 4, the bus bar body 40 according to the first embodiment of the present disclosure includes the front-rear extension 41, the front stopper 42, and the rear stopper 43.

The front-rear extension 41 extends in a forward/backward direction, and is fitted into the anti-movement slit 13 from the top. In a state in which the front-rear extension 41 is fitted into the anti-movement slits 13, the front-rear extension 41 is held in contact with the bus bar support 20, and thus movement thereof in a lateral direction is restricted.

The front stopper 42 is formed at a front end of the front-rear extension 41 so as to extend to a right side, and is held in contact with a front surface of the bus bar support 20. The front stopper 42 has a shape standing erect in a vertical direction, and is disposed in front of the bus bar support 20, and a rear end thereof is in surface contact with the front surface of the bus bar support 20. The terminal connector 50 is formed to pass through the front stopper 42 in a forward/backward direction in a hole shape. The front stopper 42 is held in contact with the front surface of the bus bar support 20, and thus backward movement thereof is restricted.

The rear stopper 43 is formed at a rear end of the front-rear extension 41 so as to extend to a right side, and is held in contact with a rear surface of the bus bar support 20. The rear stopper 43 has a shape extending flatly in a horizontal direction, and is disposed in the rear of the bus bar support 20, and a front end thereof is in surface contact with the rear surface of the bus bar support 20. In this case, the rear stopper 43 can be rested on the terminal block body 10.

The rear stopper 43 has a shape extending flatly in a horizontal direction, and is continuously connected to the coil connector 60 that extends in a forward/backward direction. In a state in which the rear stopper 43 is disposed to face the front stopper 42, the rear stopper 43 is held in contact with the rear surface of the bus bar support 20, and thus forward movement thereof is restricted.

The front-rear extension 41 is fitted into the anti-movement slit 13 formed on a left side of the bus bar support 20, and is held in contact with a side of the bus bar support 20. The front stopper 42 extends rightward from a front end of the front-rear extension 41, and is held in contact with a front end of the bus bar support 20. The rear stopper 43 extends from a rear end of the front-rear extension 41 to a right side facing the front stopper 42, and is held in contact with a rear end of the bus bar support 20.

The front-rear extension 41, the front stopper 42, and the rear stopper 43 have a shape bent in multiple steps so as to have a "C" shape on the whole. If the bus bar body 40 is formed of an elastic material such as a metallic material, the bus bar support 20 and the bus bar body 40 can be elastically come into contact with each other at a set strength according to lengths, angles, extension shapes, etc. of the front-rear extension 41, the front stopper 42, and the rear stopper 43, for instance, by forming a length of the front-rear extension 41 to be shorter than a forward/backward length of the bus bar support 20 by a given length or forming the front stopper 42 and the rear stopper 43 to be inclined or bent backward and forward, respectively.

Thus, the contact between the bus bar support 20 and the bus bar body 40 can be closely come into contact with each other at a set strength in multiple directions including a lateral direction and a forward/backward direction as illustrated by arrows in FIG. 4, thereby stably preventing movement of the bus bar body 40, and securing structural stability of the entire terminal block assembly 1 for wire connection of a contact motor.

The front-rear extension 41, the front stopper 42, and the rear stopper 43 are in close contact with the bus bar support 20 in the lateral direction and the forward/backward direction as described above, and thus movement of the bus bar body 40 in the forward/backward direction and the lateral direction is restricted. Further, as the coil connector 60 that is integrally connected to the bus bar body 40 is rested on the terminal block body 10, downward movement thereof is stably restricted.

Therefore, according to the first embodiment of the present disclosure, there is no need to additionally apply separate pressing elements for pressing and holding the plurality of bus bar bodies 40 in close contact with the bus bar supports 20 in multiple directions in consideration of vibrations of a vehicle, and the like, and thus the plurality of bus bar bodies 40 can be easily applied in a simpler structure as mediums for electrically connecting the connector terminals 2 and the motor coils 3. To be more specific, the number of components can be further reduced, so that production and management can be easily conducted, and productivity can be improved by simplification of an assembly process.

The first embodiment of the present disclosure having the shape described above can be easily produced in a form in which the bus bar bodies 40 and the coil connectors 60 are integrally connected by bending front and rear ends of a metal piece having a forward/backward extension length in a lateral direction and bending a part of the rear end in a circular shape. Further, the terminal connectors 50 are formed to pass through the front ends of the bus bar bodies 40, and thereby the first embodiment of the present disclosure may have a structure in which the bus bar body 40, the terminal connector 50, and the coil connector 60 are integrated as a single component.

Figure 5:
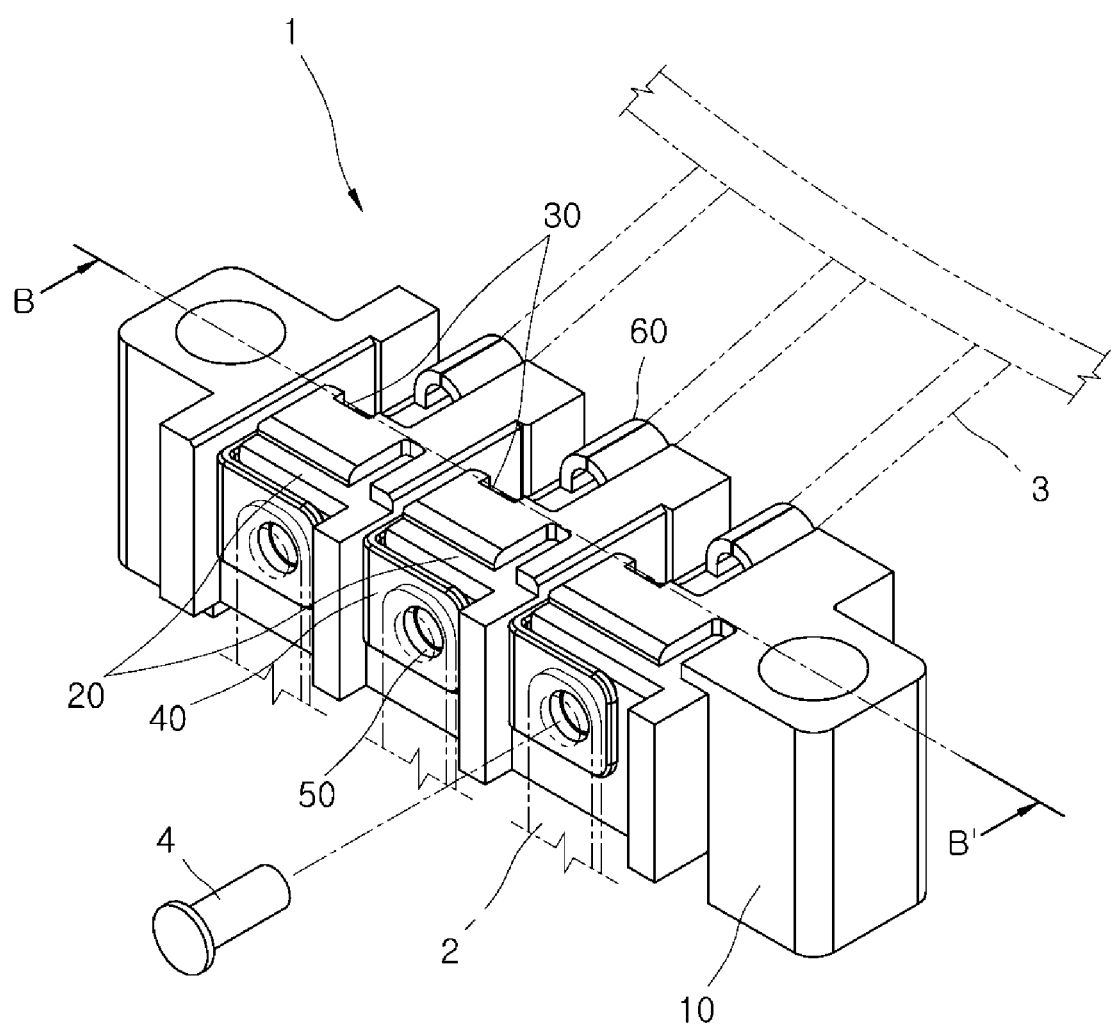
FIG. 5 is a perspective view schematically illustrating a terminal block assembly for wire connection of a motor according to a second embodiment of the present disclosure.
Figure 6:
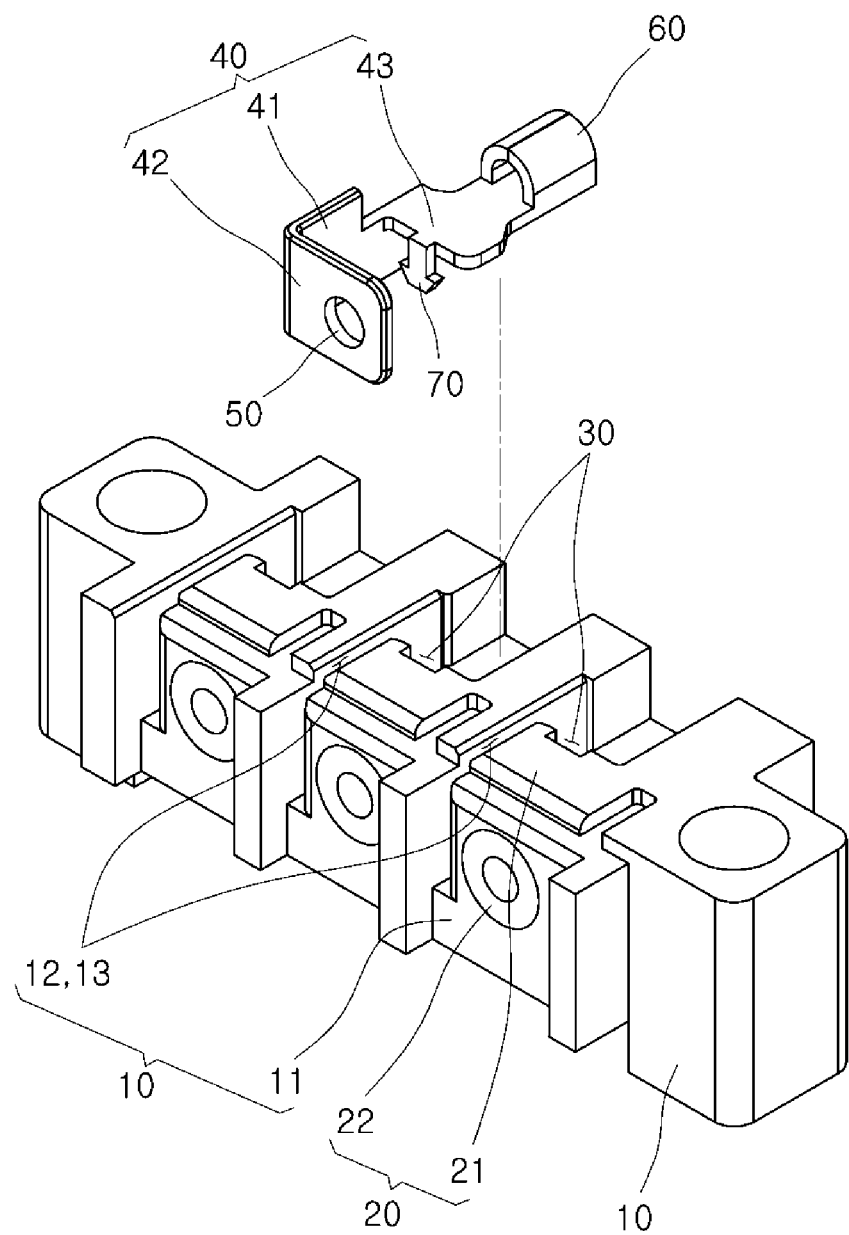
FIG. 6 is an exploded perspective view schematically illustrating main parts of the terminal block assembly for wire connection of a motor according to the second embodiment of the present disclosure.

FIG. 5 is a perspective view schematically illustrating a terminal block assembly for wire connection of a motor according to a second embodiment of the present disclosure, and FIG. 6 is an exploded perspective view schematically illustrating main parts of the terminal block assembly for wire connection of a motor according to the second embodiment of the present disclosure.

Hereinafter, in describing a terminal block assembly 1 for wire connection of a motor according to the second embodiment of the present disclosure with reference to FIGS. 5 to 8, detailed description of configurations identical or corresponding to those of the terminal block assembly 1 for wire connection of a motor according to the first embodiment of the present disclosure will be omitted to avoid duplicate description.

Referring to FIGS. 5 and 6, in comparison with the terminal block assembly 1 for wire connection of a motor according to the first embodiment of the present disclosure, the terminal block assembly 1 for wire connection of a motor according to the second embodiment of the present disclosure has a structure that further includes bus bar fastening grooves 30 and insertion stoppers 70, in addition to a terminal block body 10, bus bar supports 20, bus bar bodies 40, terminal connectors 50, and coil connectors 60.

The description of the terminal block body 10, the bus bar supports 20, the bus bar bodies 40, the terminal connectors 50, and the coil connectors 60 of the terminal block assembly 1 for wire connection of a motor according to the second embodiment of the present disclosure refers to that of the structure of the terminal block assembly 1 for wire connection of a motor according to the first embodiment of the present disclosure without a change.

The bus bar fastening grooves 30 are parts into which the insertion stoppers 70 formed integrally with the bus bar bodies 40 and the coil connectors 60 are inserted and caught, and are formed in rear ends of the bus bar supports 20 and an upper portion of the terminal block body 10 in a sunk way. When the bus bar bodies 40 and the coil connectors 60 are rested on and connected to the terminal block body 10 and the bus bar supports 20, the insertion stoppers 70 formed to protrude from the bus bar bodies 40 or the coil connectors 60 are inserted and caught into the bus bar fastening grooves 30.

Each of the bus bar fastening grooves 30 according to the second embodiment of the present disclosure has a structure in which a guiding groove 31 and a catching groove 32 are continuously formed to communicate with each other. The guiding groove 31 is a part for guiding the insertion stopper 70 to the catching groove 32, and is formed to extend on a rear end of the bus bar support 20 in an upward/downward direction. The guiding groove 31 is formed at the rear end of the bus bar support 20, but is formed to extend from an upper end to a lower end of the bus bar support 20.

The catching groove 32 is formed in the upper portion of the terminal block body 10 in a sunk way. The catching groove 32 is formed to communicate with a lower portion of the guiding groove 31, and the insertion stopper 70 passing the guiding groove 31 is finally inserted and caught into the catching groove 32.

The insertion stopper 70 has a structure that is connected integrally with the bus bar body 40 and the coil connector 60, is a part that is inserted and caught into the bus bar fastening groove 30, is formed to protrude downward from the bus bar body 40 or the coil connector 60, and is fitted and fixed into the bus bar fastening groove 30 formed in the terminal block body 10 in a sunk way.

Figure 7:
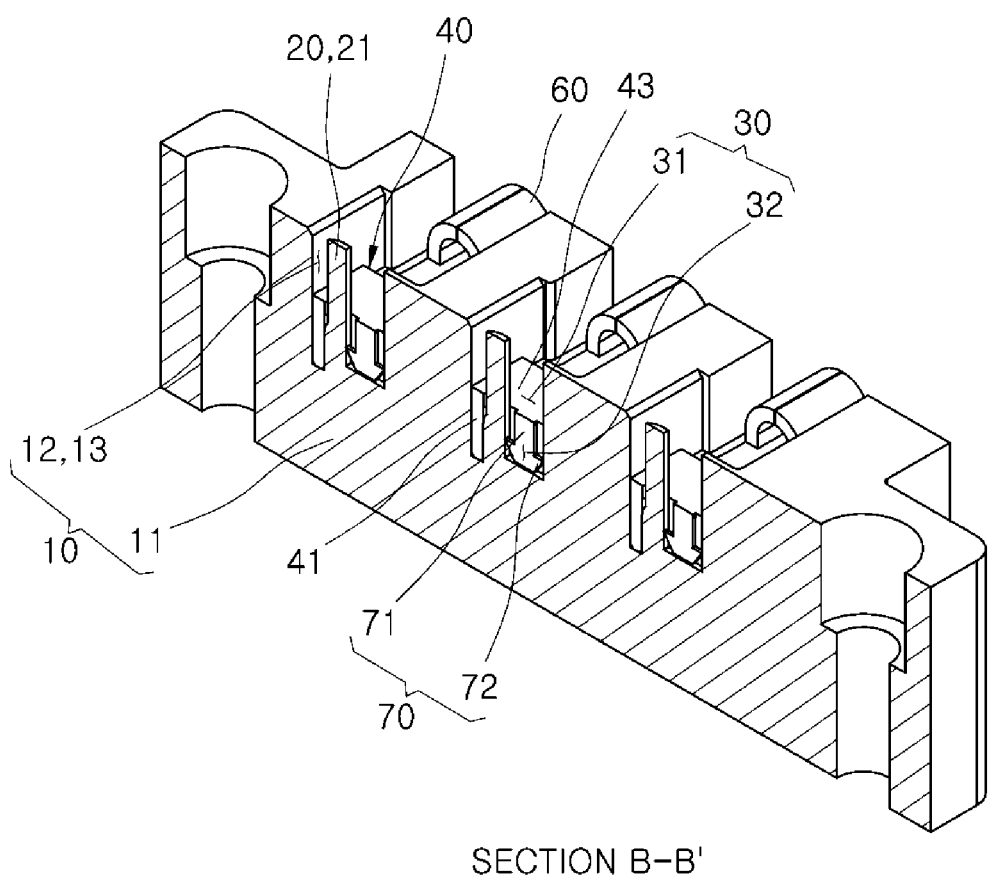
FIG. 7 is a sectional view taken along line B-B' of FIG. 5.
Figure 8:
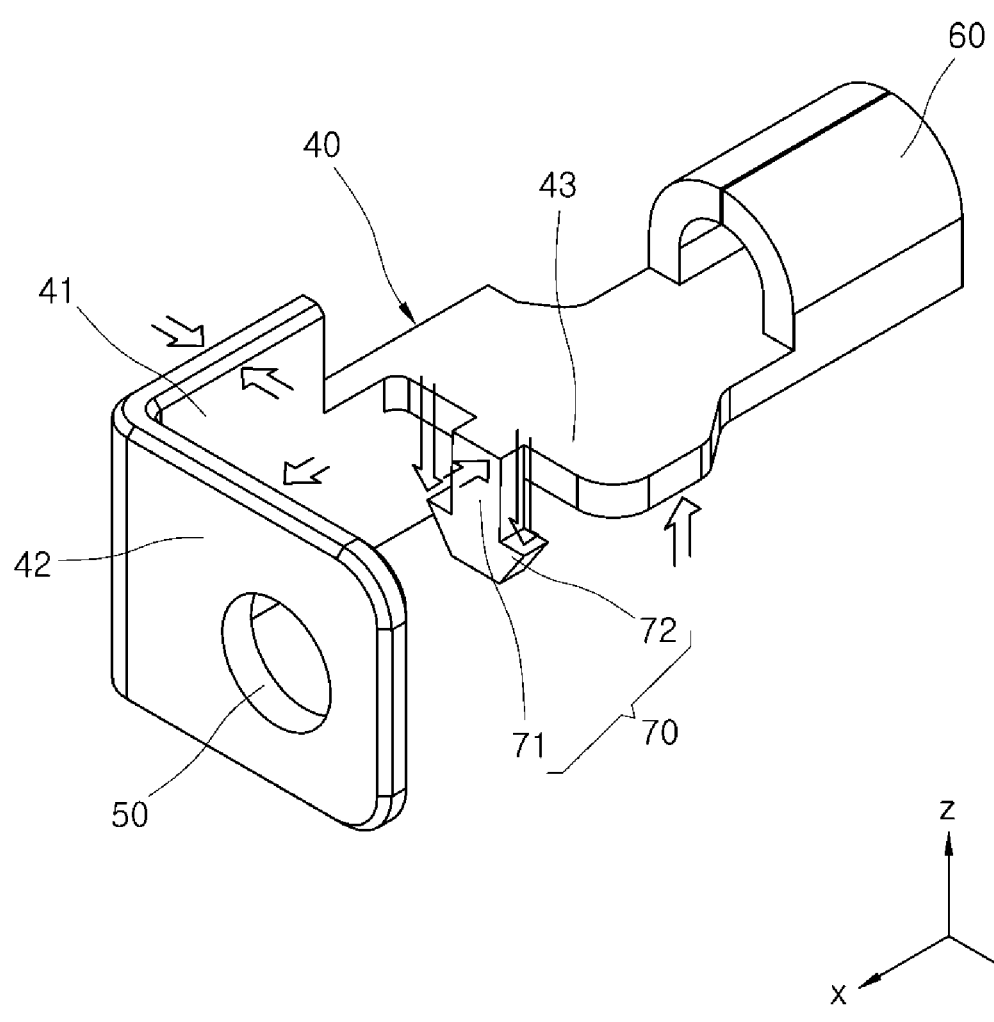
FIG. 8 is a conceptual view illustrating movement restricting directions of a bus bar body and an insertion stopper of the terminal block assembly for wire connection of a motor according to the second embodiment of the present disclosure.

FIG. 7 is a sectional view taken along line B-B' of FIG. 5, and FIG. 8 is a conceptual view illustrating movement restricting directions of the bus bar body and the insertion stopper of the terminal block assembly for wire connection of a motor according to the second embodiment of the present disclosure.

Referring to FIGS. 7 and 8, the insertion stopper 70 according to the second embodiment of the present disclosure includes a protrusion 71 and an anti-separation catch 72.

The protrusion 71 is formed on the bus bar body 40 or the coil connector 60 so as to protrude downward toward the terminal block body 10. The protrusion 71 illustrated in FIGS. 7 and 8 according to the second embodiment of the present disclosure has a shape that protrudes downward from a front end of the rear stopper 43 of the bus bar body 40.

The protrusion 71 has a shape standing erect in a vertical direction, is disposed in the rear of the bus bar support 20, passes the guiding groove 31 of the bus bar fastening groove 30, and is inserted into the catching groove 32. The anti-separation catch 72 is formed on left and right sides of the protrusion 71 in a leftward/rightward direction, and is held in pressure contact with an inner surface of the catching groove 32.

The anti-separation catch 72 has a shape in which a width thereof is reduced toward an end of the protrusion 71, namely toward a lower portion. Thus, the insertion stopper 70 can be easily led into the bus bar fastening groove 30 in a downward direction, and as an upper portion of the anti-separation catch 72 is positively held in pressure contact with an inner surface of the bus bar fastening groove 30 in a state in which the insertion stopper 70 is inserted into the bus bar fastening groove 30, upward movement thereof can be stably restricted.

The bus bar fastening groove 30 according to the second embodiment of the present disclosure has a structure including the guiding groove 31 and the catching groove 32, but is not limited thereto. The bus bar fastening groove 30 according to the present disclosure may include only one of the guiding groove 31 and the catching groove 32. For example, only the catching groove 32 may be formed without the guiding groove 31, and a pressure contact and catching structure between the guiding groove 31 and the insertion stoppers 70 by forming the insertion stopper 70 in an upward bent way may be implemented.

According to the second embodiment of the present disclosure, a component formed by integrally connecting the bus bar body 40, the coil connector 60, and the insertion stopper 70 is brought into close contact with the bus bar support 20 by the front-rear extension 41, the front stopper 42, and the rear stopper 43 in a lateral direction and a forward/backward direction, and thus movement thereof in the forward/backward direction and the lateral direction is restricted. The component is rested on the terminal block body 10 by the rear stopper 43 and the coil connector 60, and thus downward movement thereof is restricted. The insertion stopper 70 is caught into the bus bar fastening groove 30, and thus upward movement thereof is restricted.

Thus, according to the second embodiment of the present disclosure, in comparison with the first embodiment of the present disclosure, in a state in which the component in which the bus bar body 40, the coil connector 60, and the insertion stopper 70 are integrally connected is assembled and joined to a component in which the terminal block body 10, the bus bar support 20, and the bus bar fastening groove 30 are integrally formed, movement thereof in the forward/backward direction and the lateral direction can be stably restricted, and upward movement thereof can also be stably restricted.

Further, according to the second embodiment of the present disclosure, the bus bar body 40 can formed by bending front and rear ends of a metal piece having a forward/backward extension length in a lateral direction, and the coil connector 60 can be formed by bending a part of the rear end in a circular shape. The bus bar body 40, the coil connector 60, and the insertion stopper 70 may be easily produced in an integrally connected shape by downward bending a portion corresponding to the insertion stopper 70.

Figure 9:
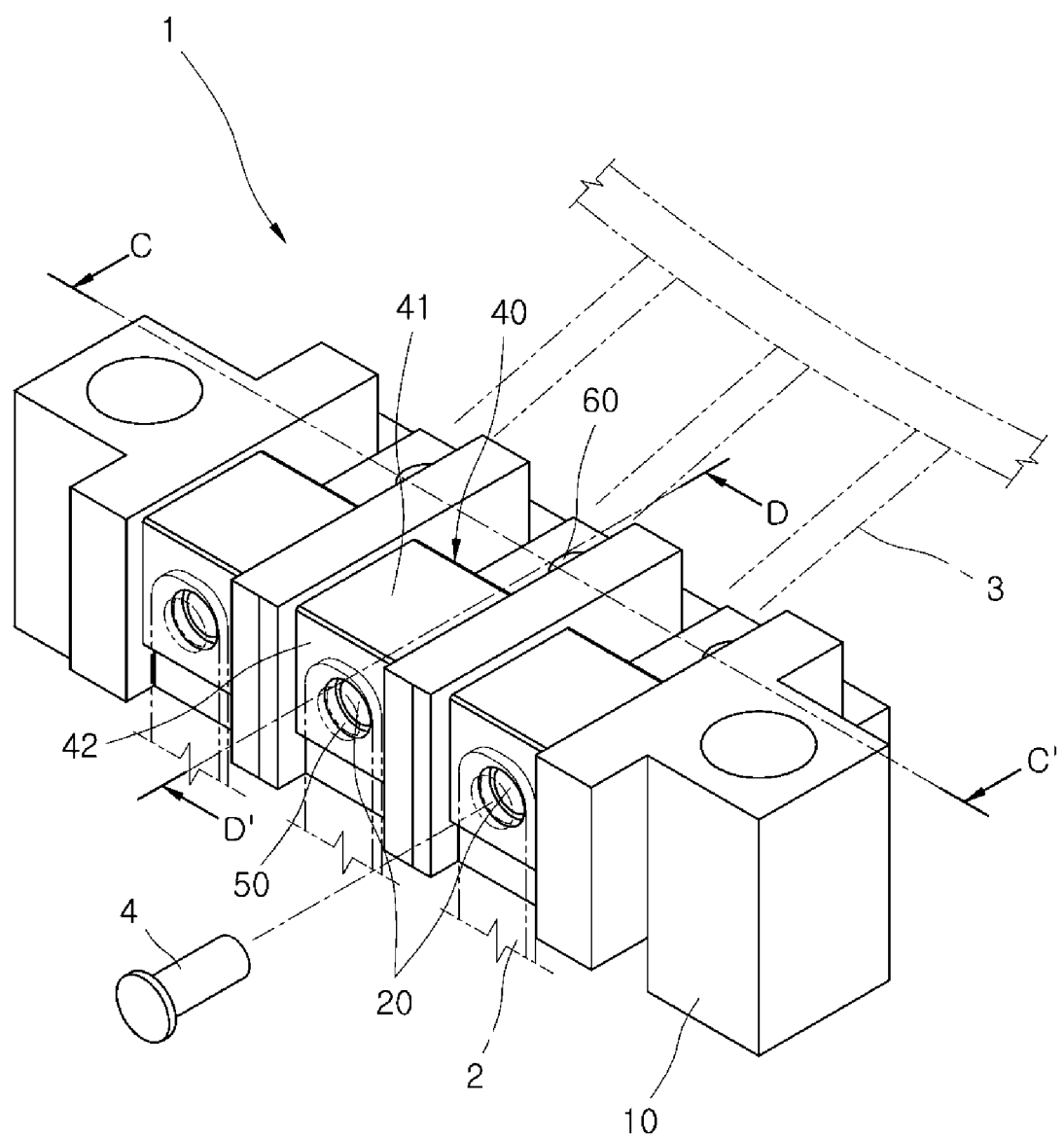
FIG. 9 is a perspective view schematically illustrating a terminal block assembly for wire connection of a motor according to a third embodiment of the present disclosure.
Figure 10:
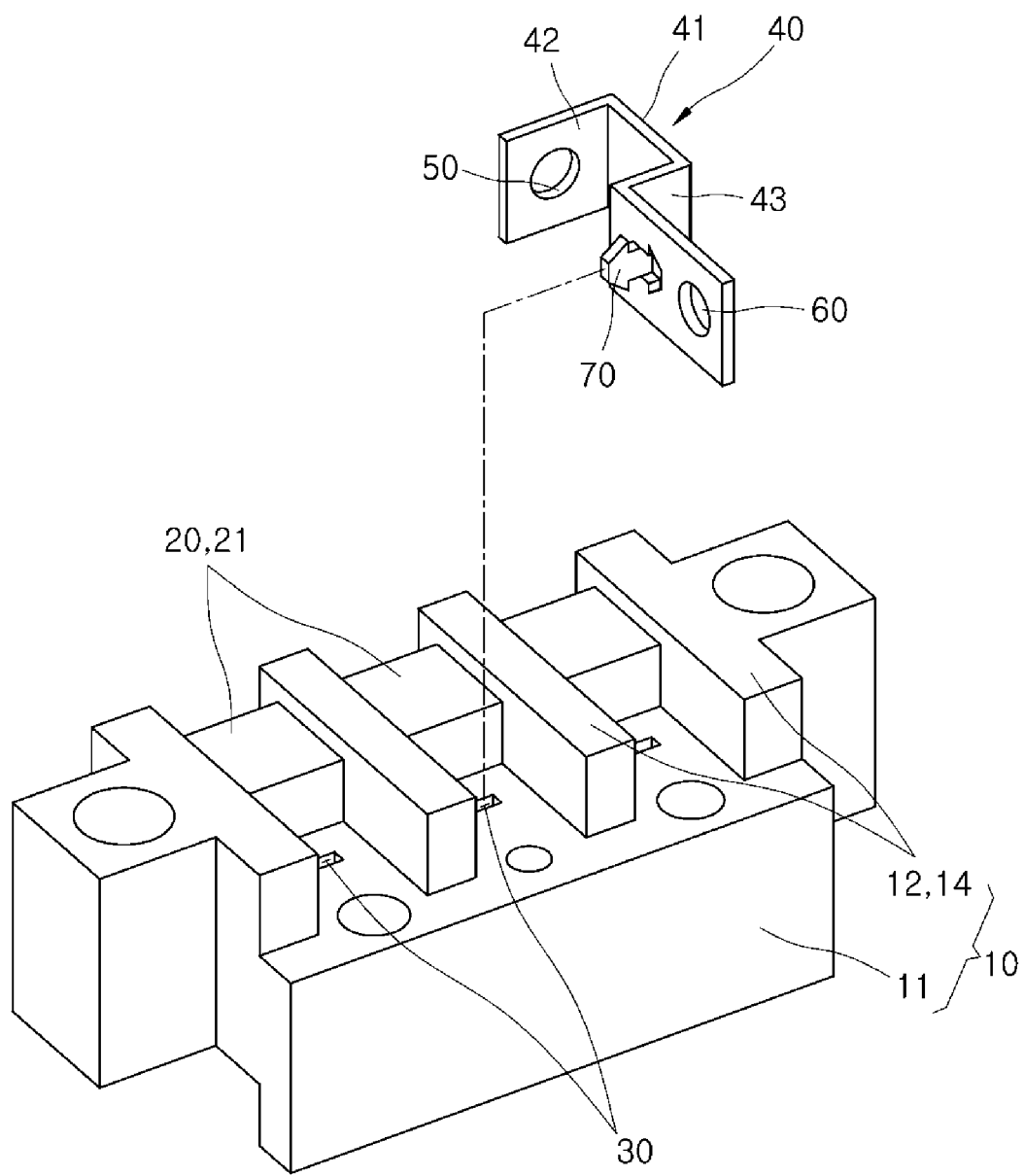
FIG. 10 is an exploded perspective view schematically illustrating main parts of the terminal block assembly for wire connection of a motor according to the third embodiment of the present disclosure.

FIG. 9 is a perspective view schematically illustrating a terminal block assembly for wire connection of a motor according to a third embodiment of the present disclosure, and FIG. 10 is an exploded perspective view schematically illustrating main parts of the terminal block assembly for wire connection of a motor according to the third embodiment of the present disclosure.

Hereinafter, in describing a terminal block assembly 1 for wire connection of a motor according to the third embodiment and the fourth embodiment of the present disclosure with reference to FIGS. 9 to 12, detailed description of configurations identical or corresponding to those of the terminal block assembly 1 for wire connection of a motor according to the second embodiment of the present disclosure will be omitted.

Referring to FIGS. 9 and 10, like the terminal block assembly 1 for wire connection of a motor according to the second embodiment of the present disclosure, the terminal block assembly 1 for wire connection of a motor according to the third embodiment of the present disclosure has a configuration that includes a terminal block body 10, bus bar supports 20, bus bar fastening grooves 30, bus bar bodies 40, terminal connectors 50, coil connectors 60, and insertion stoppers 70.

However, in comparison with the terminal block assembly 1 for wire connection of a motor according to the second embodiment of the present disclosure, the bus bar body 40 is not erectly disposed on a left side of the bus bar support 20, and is configured to be rested on an upper portion of the bus bar support 20.

Further, in comparison with the terminal block assembly 1 for wire connection of a motor according to the second embodiment of the present disclosure, the terminal block assembly 1 for wire connection of a motor according to the third embodiment of the present disclosure is configured such that a partition 12 does not have a structure of an anti-movement slit 13, but has a structure including anti-movement walls 14.

The anti-movement walls 14 are formed on left and right sides of the bus bar support 20. To be more specific, the anti-movement walls 14 are formed to protrude upward from the bus bar support 20, and are formed to further protrude forward and backward from the bus bar support 20. Thus, in a state in which the bus bar body 40 is rested on the bus bar support 20, the bus bar body 40 is configured such that both left and right ends of a front-rear extension 41, a front stopper 42, and a rear stopper 43 come into contact with a pair of left and right anti-movement walls 14 in a lateral direction.

The bus bar body 40 according to the third embodiment of the present disclosure includes the front-rear extension 41, the front stopper 42, and the rear stopper 43, is rested on an upper portion of the bus bar support 20 with a structure in which the front-rear extension 41 extends in a horizontal direction, and the front stopper 42 extends downward from a front end of the front-rear extension 41 and is in surface contact with a front surface of the bus bar support 20, and the rear stopper 43 extends downward from a rear end of the front-rear extension 41 and is in contact with a rear surface of the bus bar support 20.

The description of the terminal block body 10, the bus bar supports 20, the bus bar bodies 40, the terminal connectors 50, and the coil connectors 60 of the terminal block assembly 1 for wire connection of a motor according to the third embodiment of the present disclosure refers to that of the structure of the terminal block assembly 1 for wire connection of a motor according to the first embodiment of the present disclosure without a change.

The insertion stopper 70 of the terminal block assembly 1 for wire connection of a motor according to the third embodiment of the present disclosure is formed to protrude downward from an intermediate portion of the coil connector 60, and the bus bar fastening groove 30 has a structure formed at a position corresponding to the insertion stopper 70. In this case, the insertion stopper 70 is located apart from the bus bar support 20, and the bus bar fastening groove 30 has a structure formed in an upper portion of the terminal block body 10 in a sunk way.

Figure 11:
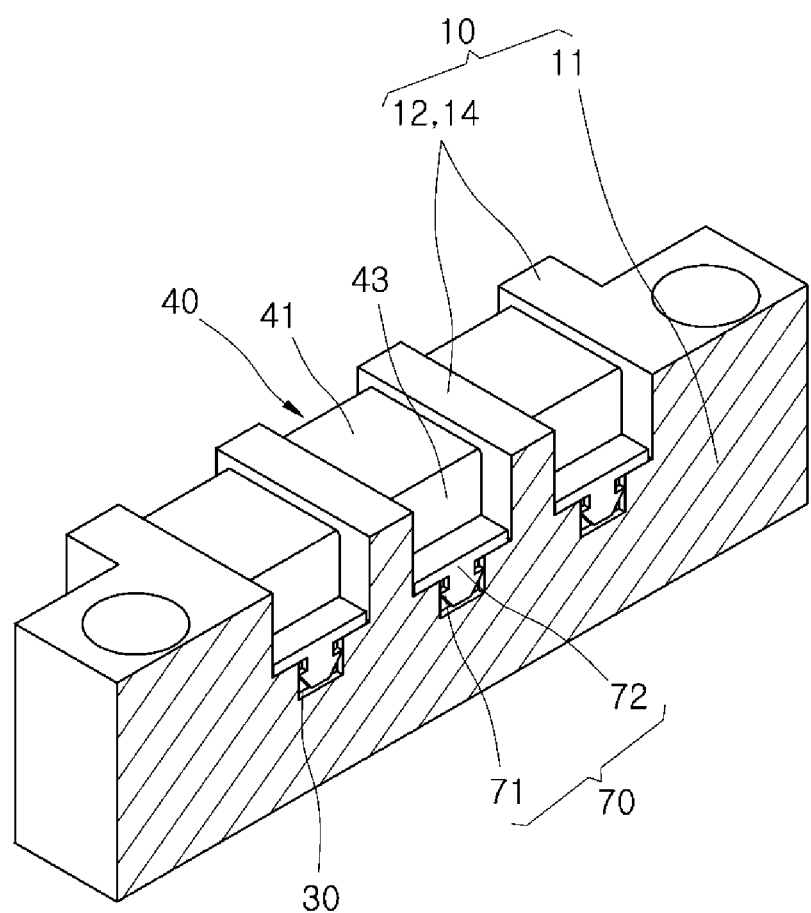
FIG. 11 is a sectional view taken along line C-C' of FIG. 5.

In addition, the description of the bus bar fastening groove 30 and the insertion stopper 70 of the terminal block assembly 1 for wire connection of a motor according to the third embodiment of the present disclosure refers to that of the structure of the terminal block assembly 1 for wire connection of a motor according to the second embodiment of the present disclosure without a change. FIG. 11 is a sectional view taken along line C-C' of FIG. 5, and FIG. 12 is a conceptual view illustrating movement restricting directions of the bus bar body and the insertion stopper of the terminal block assembly for wire connection of a motor according to the third embodiment of the present disclosure.

Figure 12:
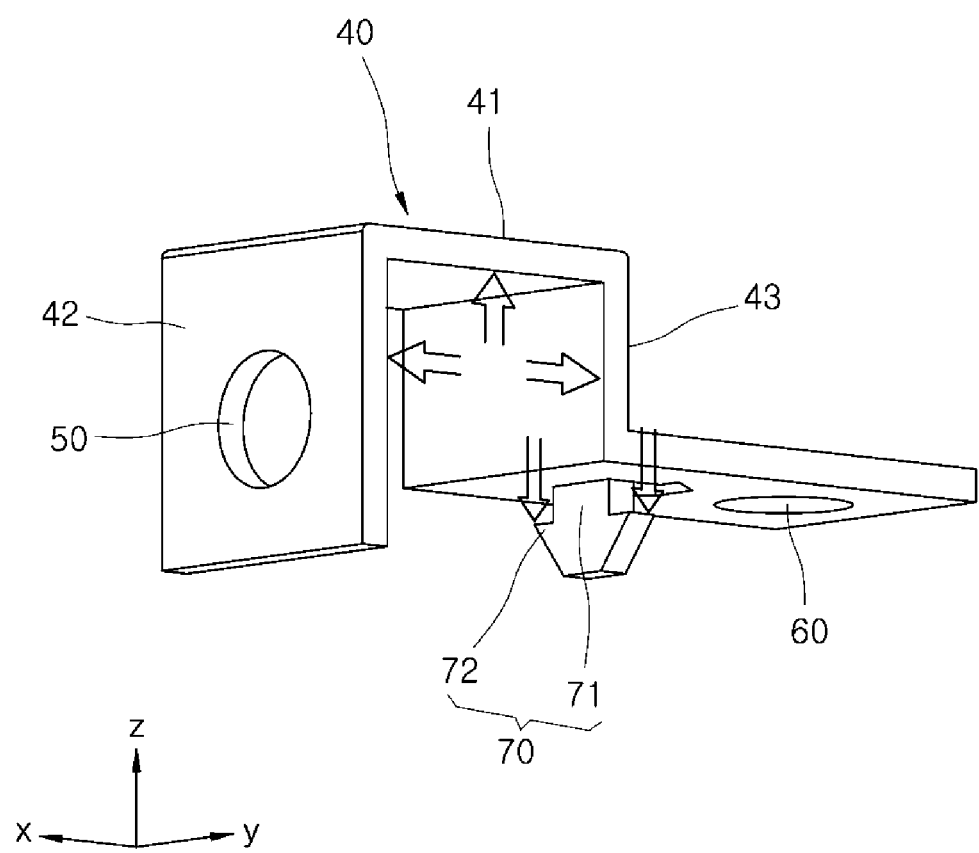
FIG. 12 is a conceptual view illustrating movement restricting directions of a bus bar body and an insertion stopper of the terminal block assembly for wire connection of a motor according to the third embodiment of the present disclosure.

According to the third embodiment of the present disclosure, a component formed by integrally connecting the bus bar body 40, the coil connector 60, and the insertion stopper 70 as illustrated in FIG. 12 is configured such that movement thereof in a lateral direction is stably restricted by the anti-movement walls 14, downward movement thereof is allowed by the front-rear extension 41 rested on the bus bar support 20, movement thereof in a forward/backward direction is restricted by the front stopper 42 and the rear stopper 43, and upward movement thereof is restricted because the insertion stopper 70 is caught into the bus bar fastening groove 30 as illustrated in FIG. 11.

Therefore, according to the third embodiment of the present disclosure, in a state in which the component in which the bus bar body 40, the coil connector 60, and the insertion stopper 70 are integrally connected is assembled and joined to a component in which the terminal block body 10, the bus bar support 20, and the bus bar fastening groove 30 are integrally formed, movement thereof in a forward/backward direction and a lateral direction can be stably restricted, and upward movement thereof can also be stably restricted.

The bus bar body 40 having a structure in which the front-rear extension 41, the front stopper 42, and the rear stopper 43 are continuously connected can be formed by downward bending front and rear ends of a metal piece having a forward/backward extension length, and the coil connector 60 can be formed integrally with the bus bar body 40 by bending a part of the rear end in a circular shape or forming a hole, which can join a coil 3 of the motor or a connection terminal (not illustrated) connected to the coil 3 of the motor, to pass through the rear end.

Further, a part of the coil connector 60 which has a shape corresponding to an edge of the insertion stopper 70 is punched and then bent downward, and thereby as illustrated in FIG. 12, a component having a shape in which the bus bar body 40, the coil connector 60, and the insertion stopper 70 are integrally connected can be easily produced.

In this way, in the case where the bus bar body 40 and the coil connector 60 are formed by a process of punching an integrally connected metal piece, a position of the insertion stopper 70 can be located at an intermediate portion of the bus bar body 40 or the coil connector 60 in a width direction, compared to the case where the insertion stopper 70 is formed by bending an edge of the bus bar body 40 or the coil connector 60, and in bending downward, a bending direction of the insertion stopper 70 can be more freely varied and applied to a lateral direction, a forward/backward direction, or an oblique direction.

Figure 13:
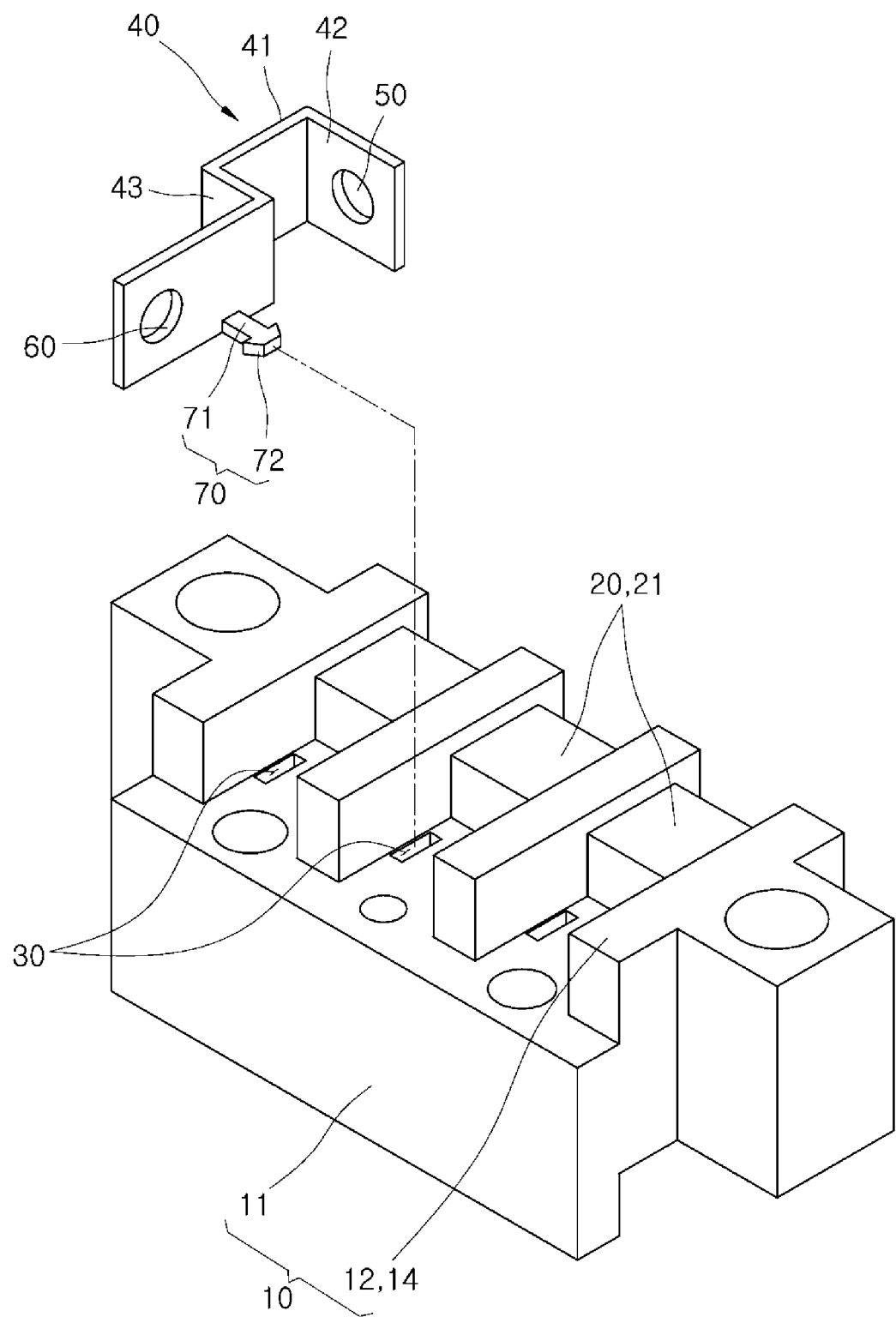
FIG. 13 is an exploded perspective view schematically illustrating main parts of a terminal block assembly for wire connection of a motor according to a fourth embodiment of the present disclosure.
Figure 14:
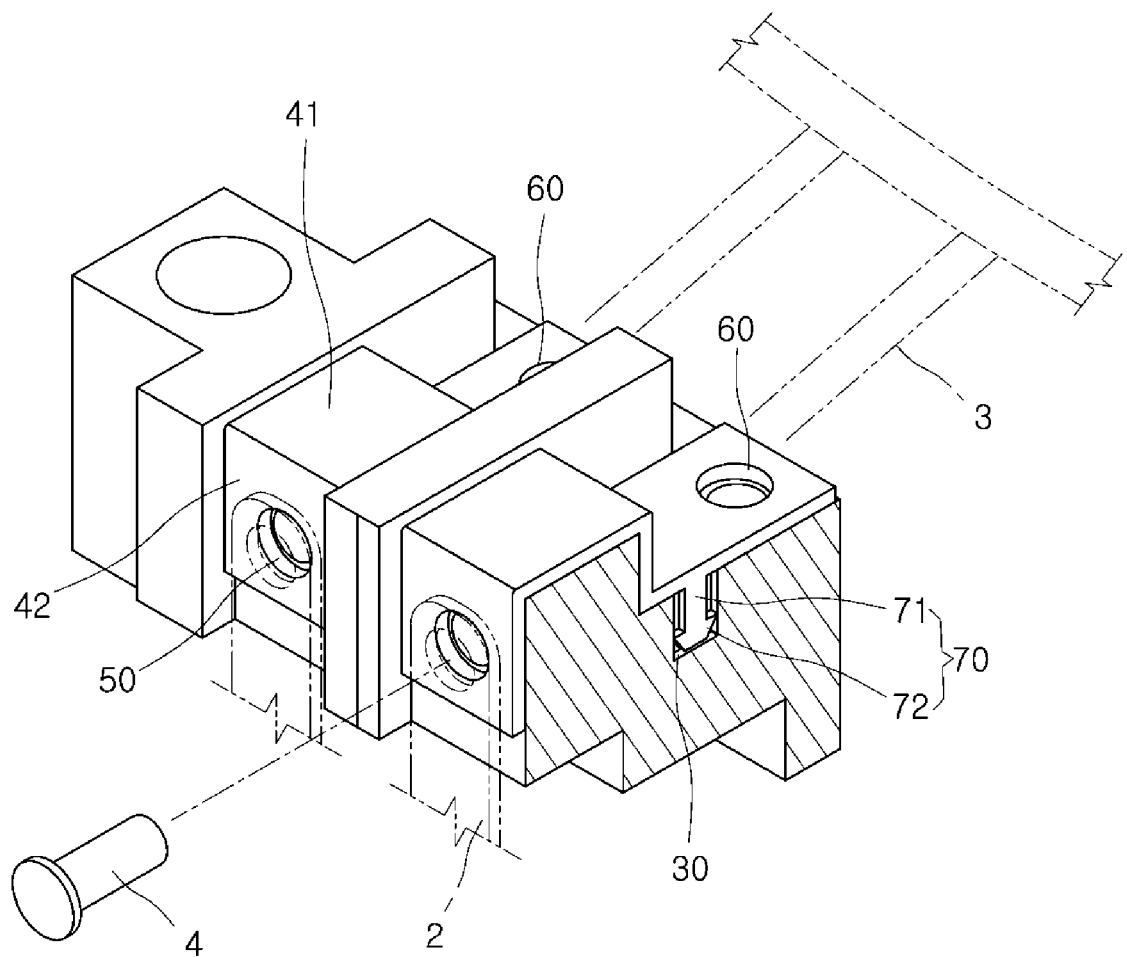
FIG. 14 is a sectional view taken along line D-D' of FIG. 5.

FIG. 13 is an exploded perspective view schematically illustrating main parts of a terminal block assembly for wire connection of a motor according to a fourth embodiment of the present disclosure. FIG. 14 is a sectional view taken along line D-D' of FIG. 5, and FIG. 15 is a conceptual view illustrating movement restricting directions of a bus bar body and an insertion stopper of the terminal block assembly for wire connection of a motor according to the fourth embodiment of the present disclosure.

Hereinafter, in describing a terminal block assembly 1 for wire connection of a motor according to the fourth embodiment of the present disclosure with reference to FIGS. 13 to 15, detailed description of configurations identical or corresponding to those of the terminal block assembly 1 for wire connection of a motor according to the third embodiment of the present disclosure will be omitted.

Referring to FIGS. 13 and 14, in comparison with the terminal block assembly 1 for wire connection of a motor according to the third embodiment of the present disclosure, the terminal block assembly 1 for wire connection of a motor according to the fourth embodiment of the present disclosure has a shape in which an insertion stopper 70 protrudes downward from a right end of a coil connector 60, and has a structure in which a bus bar fastening groove 30 is formed at a position corresponding to the insertion stopper 70.

Figure 15:
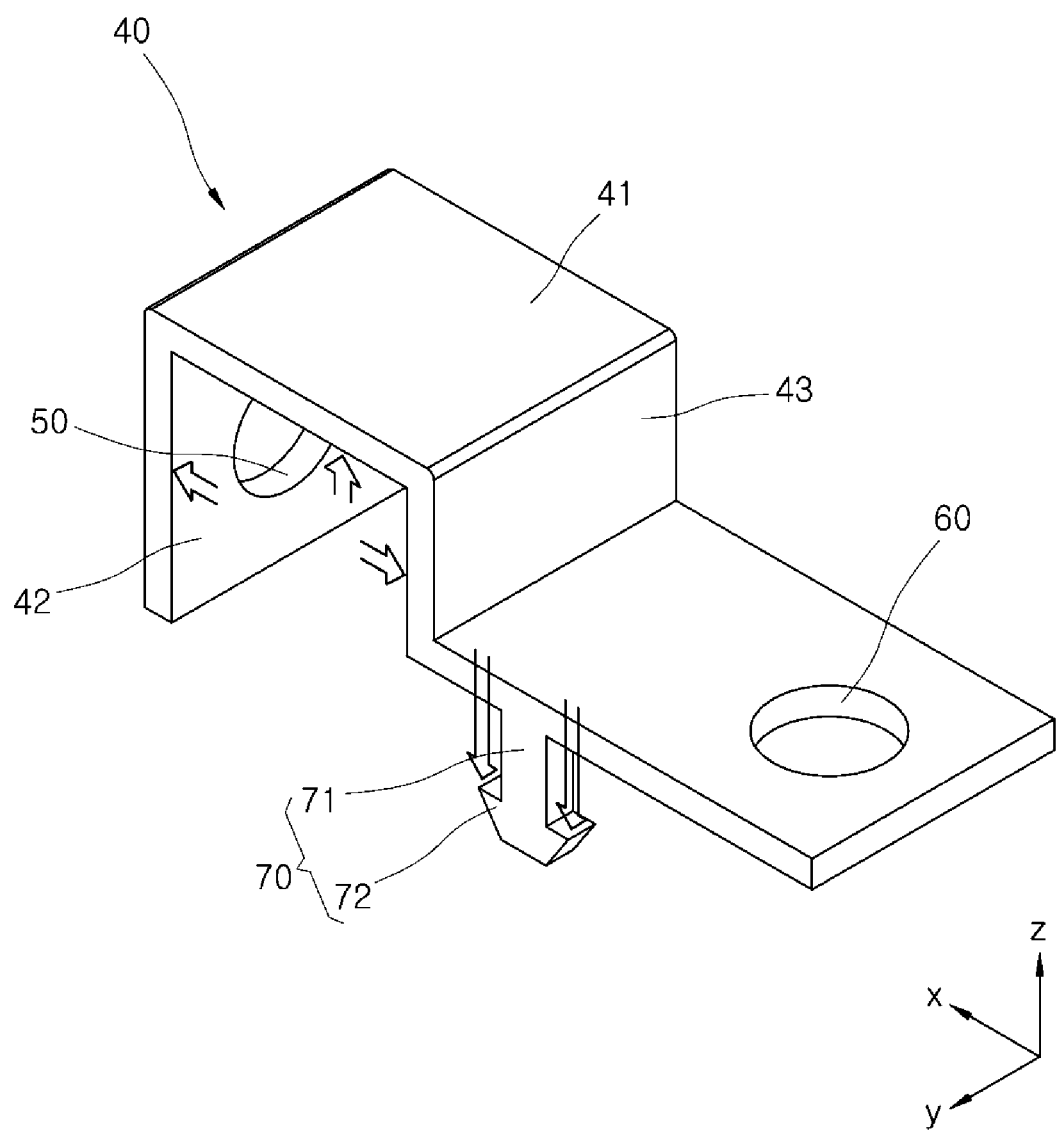
FIG. 15 is a conceptual view illustrating movement restricting directions of a bus bar body and an insertion stopper of the terminal block assembly for wire connection of a motor according to the fourth embodiment of the present disclosure.

According to the fourth embodiment of the present disclosure, a component formed by integrally connecting a bus bar body 40, the coil connector 60, and the insertion stopper 70 as illustrated in FIG. 15 is configured such that movement thereof in a lateral direction is stably restricted by anti-movement walls 14, downward movement thereof is allowed by a front-rear extension 41 rested on a bus bar support 20, and movement thereof in a forward/backward direction is restricted by a front stopper 42 and a rear stopper 43, and upward movement thereof is restricted because the insertion stopper 70 is caught into the bus bar fastening groove 30 as illustrated in FIG. 14.

Therefore, according to the fourth embodiment of the present disclosure, in a state in which the component in which the bus bar body 40, the coil connector 60, and the insertion stopper 70 are integrally connected is assembled and joined to a component in which a terminal block body 10, the bus bar support 20, and the bus bar fastening groove 30 are integrally formed, movement thereof in a forward/backward direction and a lateral direction can be stably restricted, and upward movement thereof can also be stably restricted.

The bus bar body 40 having a structure in which the front-rear extension 41, the front stopper 42, and the rear stopper 43 are continuously connected can be formed by downward bending front and rear ends of a metal piece having a forward/backward extension length, and the coil connector 60 can be formed integrally with the bus bar body 40 by bending a part of the rear end in a circular shape or forming a hole, which can join a coil 3 of the motor or a connection terminal (not illustrated) connected to the coil 3 of the motor, to pass through the rear end. Further, a component having a shape in which the bus bar body 40, the coil connector 60, and the insertion stopper 70 are integrally connected as illustrated in FIG. 15 can be easily produced by downward bending the insertion stopper 70 formed on a right side of the coil connector 60.

According to the terminal block assembly 1 for wire connection of a motor having the configuration described above according to each of the embodiments of the present disclosure, a second component having a structure in which the bus bar body 40, the terminal connector 50, and the coil connector 60 are integrally connected can be stably held in contact with and bonded to a first component having a structure in which the terminal block body 10 and the bus bar support 20 are integrally connected, in multiple directions including a lateral direction and a forward/backward direction, by a simple assembling process of engaging the bus bar body 40 with the bus bar support 20 and connecting the connector terminal 2 to the terminal connector 50 lateral direction. An assembling method of the terminal block assembly for wire connection of a motor according to the present disclosure includes a bus bar resting step and a connector terminal connecting step.

In the bus bar resting step, the bus bar body 40 having a bent shape corresponding to an outer surface of the bus bar support 20 is engaged with the bus bar support 20 formed on the terminal block body 10. In the connector terminal connecting step, the terminal connector 50 formed at one end of the bus bar body 40 and the connector terminal 2 are connected to each other.

In assembling the terminal block assembly 1 for wire connection of a motor according to each of the first and second embodiments of the present disclosure, the bus bar resting step includes fitting the front-rear extension 41 of the bus bar body 40 into the anti-movement slit 13 formed to extend on one side of the bus bar support 20 in a forward/backward direction, and disposing the front stopper 42 connected to a front end of the front-rear extension 41 and the rear stopper 43 connected to a rear end of the front-rear extension 41, so as to be held in contact with front and rear surfaces of the bus bar support 20, respectively.

In assembling the terminal block assembly 1 for wire connection of a motor according to each of the third and fourth embodiments of the present disclosure, the bus bar resting step includes resting the front-rear extension 41 of the bus bar body 40 on the bus bar support 20, and disposing the front stopper 42 connected to the front end of the front-rear extension 41 and the rear stopper 43 connected to the rear end of the front-rear extension 41, so as to be held in contact with the front and rear surfaces of the bus bar support 20, respectively.

In assembling the terminal block assembly 1 for wire connection of a motor according to each of the second, third, and fourth embodiments of the present disclosure, the bus bar resting step includes fitting the bus bar body 40 into the anti-movement slit 13 or resting the bus bar body 40 on the bus bar support 20 as described above, and inserting the insertion stopper 70, formed to protrude from the bus bar body 40 or the coil connector 60, into the bus bar fastening groove 30 formed in the terminal block body 10 or the bus bar support 20.

That is, according to the bus bar resting step according to each of the second, third, and fourth embodiments of the present disclosure, by a simple assembling process of engaging the bus bar body 40 bent in a "C" shape with the bus bar support 20 having an outer surface of a "C" shape and downward inserting the insertion stopper 70 into the bus bar fastening groove 30, a second component having a structure in which the bus bar body 40, the terminal connector 50, and the coil connector 60 are integrally connected can be mounted on a first component having a structure in which the terminal block body 10 and the bus bar support 20 are integrally connected, such that movement thereof in a lateral direction, a forward/backward direction, and an upward/downward direction is also stably restricted.

In the connector terminal connecting step, the terminal fastening member 4 having a male threaded structure sequentially passes through the connector terminal 2 and the terminal connector 50 continuously disposed in a forward/backward direction as illustrated in FIG. 1, and is screwed to the terminal connection hole 22 that has a female threaded structure and is formed in the front of the bus bar support 20. Due to this assembly, the connector terminal 2 and the terminal connector 50 can be physically held in pressure contact with and electrically connected to each other.

According to the terminal block assembly 1 for wire connection of a motor having the configuration described above according to the present disclosure and the assembling method thereof, due to a simple structure in which the component having a structure in which the bus bar body 40, the terminal connector 50, and the coil connector 60 are integrally connected is rested on the terminal block body 10 or the bus bar support 20 so as to surround the outer surface of the bus bar support 20, a function of the terminal block that restricts the connector terminal 2 and the coil 3 of the motor at a set position and electrically connects the connector terminal 2 and the coil 3 can be stably implemented.

Further, the present disclosure may be easily produced as a structure in which the bus bar body 40, the terminal connector 50, and the coil connector 60 are integrated as a single component, due to a simple process of bending front and rear ends of a metal piece having a forward/backward extension length in a lateral direction or an upward/downward direction and punching a hole Further, according to the present disclosure, the bus bar body 40 is in close contact with the bus bar support 20 in a lateral direction and a forward/backward direction, such that movement thereof in the forward/backward direction and the lateral direction is stably restricted. For this reason, there is no need to additionally apply separate pressing elements for pressing and holding the plurality of bus bar bodies 40 in close contact with the bus bar supports 20 in consideration of vibrations of a vehicle, and the like, and thus the plurality of bus bar bodies 40 can be easily applied in a simpler structure. To be more specific, the number of components can be further reduced, so that production and management can be easily conducted, and productivity can be improved by simplification of an assembly process.

While the disclosure has been described with reference to the embodiments illustrated in the drawings, this is merely exemplary. Those skilled in the art will appreciate that various modifications and equivalent other embodiments are possible. Thus, the true technical scope of the disclosure should be defined by the following claims.

What is claimed is:

1. A terminal block assembly for wire connection of a motor, the terminal block assembly comprising:
    a terminal block body;
    one or more bus bar supports which are formed on the terminal block body;
    one or more bus bar bodies which have bent shapes corresponding to outer surfaces of the bus bar supports and are rested on the terminal block body or the bus bar supports;
    one or more terminal connectors which are formed at one ends of the bus bar bodies and are held in contact with one or more connector terminals; and
    one or more coil connectors which are formed at the other ends of the bus bar bodies and are connected to one or more coils of a motor,
    wherein:
    the terminal block body includes:
        a base on which the plurality of bus bar supports are formed; and
        one or more partitions which are formed on the base so as to mutually partition the plurality of bus bar supports; and
    the partition includes an anti-movement slit which is formed on one side of the bus bar support so as to extend in a forward/backward direction and through which the bus bar body passes.

2. The terminal block assembly for wire connection of the motor according to claim 1, wherein the partition includes anti-movement walls which are formed to protrude from both sides of the bus bar support and are held in contact with the bus bar body.

3. The terminal block assembly for wire connection of the motor according to claim 1, further comprising one or more bus bar fastening grooves which are formed in at least one side of the terminal block body and the bus bar support in a sunk way and into which one or more insertion stoppers formed to protrude from the bus bar body is inserted and caught.

4. The terminal block assembly for wire connection of the motor according to claim 1, which the bus bar support includes:
    a support body which is formed to protrude from an upper portion of the terminal block body, and whose front and rear surfaces are held in contact with the bus bar body; and
    a terminal connection hole which is formed in the front portion of the support body and to which a terminal fastening member passing through the connector terminal and the terminal connector is fastened.

5. The terminal block assembly for wire connection of the motor according to claim 1 wherein the bus bar body includes:
    a front-rear extension which extends in a forward/backward direction and is held in contact with the bus bar support;
    a front stopper which is connected to a front end of the front-rear extension and is held in contact with the bus bar support, such that backward movement thereof is restricted, and on which the terminal connector is formed; and
    a rear stopper which is formed to extend at a rear end of the front-rear extension in a direction facing the front stopper and is held in contact with the bus bar support, such that forward movement thereof is restricted, and which is connected to the coil connector.

6. The terminal block assembly for wire connection of the motor according to claim 5, wherein:
    the front-rear extension passes through the anti-movement slit formed on one side of the bus bar support, and is held in contact with a side of the bus bar support;
    the front stopper extends from the front end of the front-rear extension in a lateral direction, and is held in contact with a front end of the bus bar support; and
    the rear stopper extends from the rear end of the front-rear extension in a direction facing the front stopper, and is held in contact with a rear end of the bus bar support.

7. The terminal block assembly for wire connection of the motor according to claim 1, further comprising one or more insertion stoppers which are formed to protrude from at least one side of the bus bar body and the coil connector, and are inserted and caught into one or more bus bar fastening grooves formed in the terminal block body or the bus bar support.

8. The terminal block assembly for wire connection of the motor according to claim 7, which the insertion stopper includes:
    a protrusion which is formed on at least one side of the bus bar body and the coil connector so as to protrude toward the terminal block body; and
    an anti-separation catch which is formed to protrude from the protrusion, has a shape in which a width thereof is reduced toward an end of the protrusion, and is held in contact with an inner surface of the bus bar fastening groove.

9. The terminal block assembly for wire connection of the motor according to claim 1, which the bus bar body and the coil connector are integrally formed by bending front and rear ends of a metal piece having a forward/backward extension length in a lateral direction or an upward/downward direction.

10. A terminal block assembly for wire connection of a motor, the terminal block assembly comprising:

a terminal block body;
one or more bus bar supports which are formed on the terminal block body;
one or more bus bar bodies which have bent shapes corresponding to outer surfaces of the bus bar supports and are rested on the terminal block body or the bus bar supports;
one or more terminal connectors which are formed at one ends of the bus bar bodies and are held in contact with one or more connector terminals; and
one or more coil connectors which are formed at the other ends of the bus bar bodies and are connected to one or more coils of a motor,
wherein:
the bus bar body includes:
  a front-rear extension which extends in a forward/backward direction and is held in contact with the bus bar support;
  a front stopper which is connected to a front end of the front-rear extension and is held in contact with the bus bar support, such that backward movement thereof is restricted, and on which the terminal connector is formed; and
  a rear stopper which is formed to extend at a rear end of the front-rear extension in a direction facing the front stopper and is held in contact with the bus bar support, such that forward movement thereof is restricted, and which is connected to the coil connector;
the front-rear extension is rested on an upper portion of the bus bar support;
the front stopper extends downward from the front end of the front-rear extension, and is held in contact with a front end of the bus bar support; and
the rear stopper extends downward from the rear end of the front-rear extension to face the front stopper, and is held in contact with a rear end of the bus bar support.

11. An assembling method of a terminal block assembly for wire connection of a motor, the assembling method comprising:
a bus bar resting step of engaging a bus bar body having a bent shape corresponding to an outer surface of each of a plurality of bus bar supports formed on a base of a terminal block body; and
a connector terminal connecting step of mutually connecting a terminal connector, formed at one end of the bus bar body, and a connector terminal,
wherein:
a partition is formed on the base between each of the plurality of bus bar supports; and
the partition includes an anti-movement slit formed to extend on one side of the bus bar support in a forward/backward direction.

12. The assembling method of the terminal block assembly for wire connection of the motor according to claim 11, wherein the bus bar resting step includes fitting a front-rear extension of the bus bar body into the anti-movement slit, and disposing a front stopper connected to a front end of the front-rear extension and a rear stopper connected to a rear end of the front-rear extension, so as to be held in contact with front and rear surfaces of the bus bar support, respectively.

13. The assembling method of the terminal block assembly for wire connection of the motor according to claim 12, wherein the bus bar resting step includes fitting the bus bar body into the anti-movement slit, and inserting an insertion stopper, formed to protrude from at least one side of the bus bar body and a coil connector, into a bus bar fastening groove formed in at least one side of the terminal block body and the bus bar support.

14. The assembling method of the terminal block assembly for wire connection of the motor according to claim 11, wherein the bus bar resting step includes resting a front-rear extension of the bus bar body on an upper surface of the bus bar support, and disposing a front stopper connected to a front end of the front-rear extension and a rear stopper connected to a rear end of the front-rear extension, so as to be held in contact with front and rear surfaces of the bus bar support, respectively.

15. The assembling method of the terminal block assembly for wire connection of the motor according to claim 14, wherein the bus bar resting step includes resting the bus bar body on the bus bar support, and inserting an insertion stopper, formed to protrude from at least one side of the bus bar body and a coil connector, into a bus bar fastening groove formed in at least one side of the terminal block body and the bus bar support.

16. The assembling method of the terminal block assembly for wire connection of the motor according to claim 11, wherein the connector terminal connecting step includes causing a terminal fastening member to pass through the connector terminal and the terminal connector and to be fastened to a terminal connection hole formed in a front portion of the bus bar support, and holding the connector terminal and the terminal connector in pressure contact.

* * * * *